(No Model.)
J. E. TRACY & A. N. GRAHAM.
TWINE HOLDER.
No. 488,856. Patented Dec. 27, 1892.
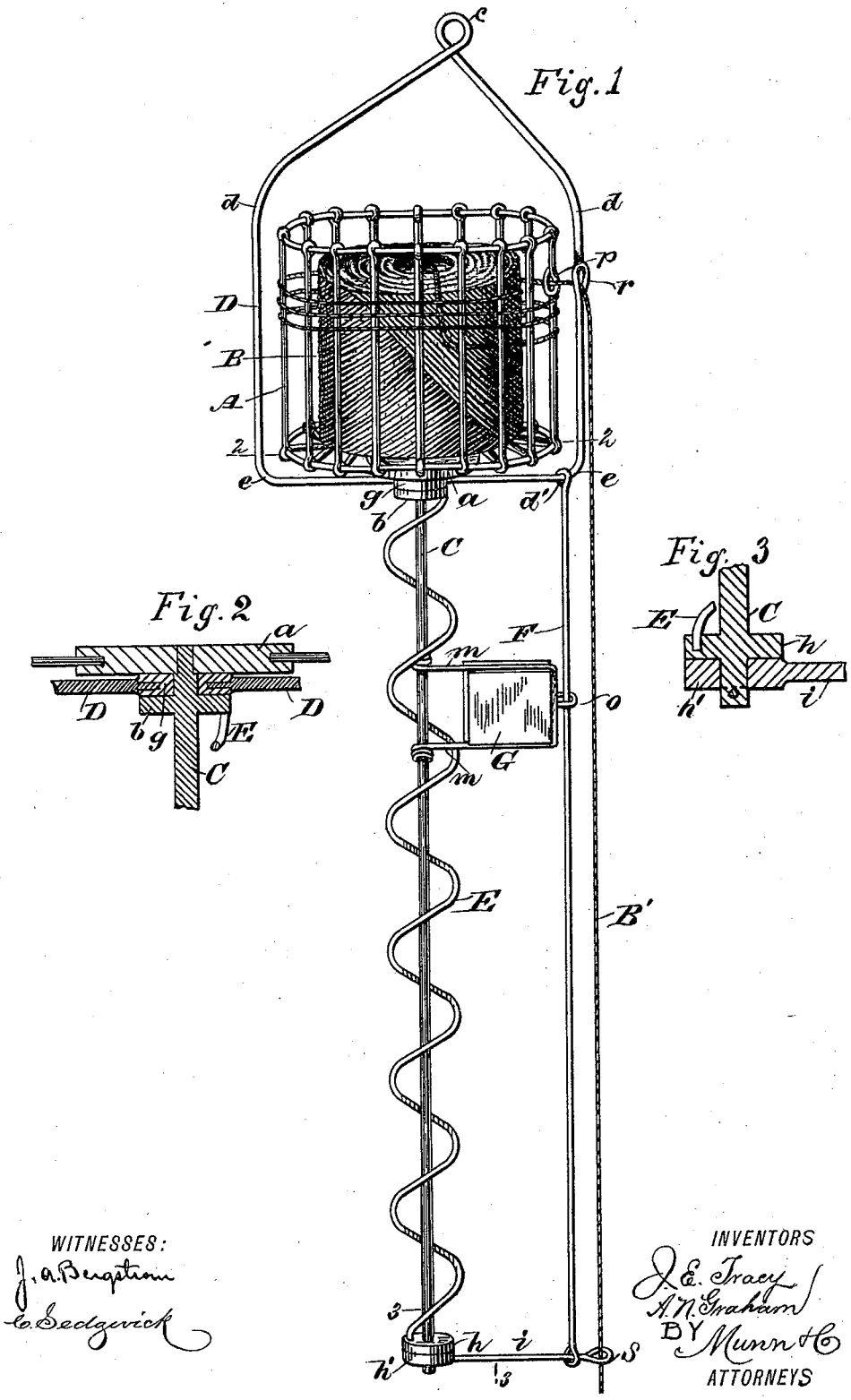

UNITED STATES PATENT OFFICE.

JOHN E. TRACY AND ARTHUR N. GRAHAM, OF CHICAGO, ILLINOIS.

TWINE-HOLDER.

SPECIFICATION forming part of Letters Patent No. 488,856, dated December 27, 1892.

Application filed October 6, 1891. Serial No. 407,851. (No model.)

*To all whom it may concern:*

Be it known that we, JOHN E. TRACY and ARTHUR N. GRAHAM, of Chicago, in the county of Cook and State of Illinois, have invented a new and useful Twine-Holder, of which the following is a full, clear, and exact description.

This invention relates to an improvement in suspensible twine holders, wherein a ball of twine is held for use; and has for its object to provide a simple, inexpensive and convenient device of the type indicated, which will freely deliver twine as required for use, and that will automatically wrap up the slack strand, so as to prevent waste or inconvenience resulting from a trailing end of the twine ball hanging pendent and lying upon the floor after a portion has been unwrapped from the same.

To this end our invention consists in the construction and combination of parts, as is hereinafter described and claimed.

Reference is to be had to the accompanying drawings, forming a part of this specification, in which similar letters of reference indicate corresponding parts in all the figures.

Figure 1 is a side view of the device, and a twine ball in position for use within the holder; Fig. 2 is an enlarged sectional view of parts shown broken, and taken on the line 2—2 in Fig. 1; and Fig. 3 is an enlarged broken sectional view of a lower portion of the device, taken on the line 3—3 in Fig. 1.

The cage A, is made of wire preferably, is open above, and of sufficient capacity to receive a twine ball B. In the center of the cage bottom, a preferably circular plate $a$, is secured to the wires forming the cage and from its center a shaft C, depends, having a proper length for its use which will appear. There is a flange $b$ formed on or affixed upon the shaft C, a short distance from the plate $a$, thereby affording an intervening channel.

The supporting device for the cage A, consists of a bracket frame D, that is also made of wire, said wire being bent to produce an eye-hole at $c$, by which the device is suspended when in use; the two limbs of the wire strand that are spread apart below the eye-hole $c$, are each bent at $d$, to render them parallel and again bent toward each other at $e$, so as to align with each other, and have their terminals oppositely attached to a perforated disk $g$, that is placed on the shaft C, loosely, between the plate $a$, and flange $b$. The connection of the cage A, with the frame D, as stated, will allow the cage to rotate and the pendent shaft C, also when the frame is suspended. Near the lower end of the shaft C, a collar $h$, is secured on it, and to said collar and upon the flange $b$, the terminal ends of a spiral track E, are attached, the latter concentrically surrounding the shaft as shown in Fig. 1. From the corner of the frame D, as at $d'$, a guide rod F, is hung which engages with a brace rod $i$, said rod having one end secured to a collar $h'$, that is loosely secured on the end of the shaft C, below and in contact with the fixed collar $h$. A weight G, of proper heft to act effectively, is loosely connected with the shaft C, by the ends of a wire bracket that embraces the top and bottom edges of the weight and projects its parallel limbs $m$, toward the shaft around which these end portions are wrapped, said limbs being separated far enough to permit them to have a sliding contact with the spiral track E. A loop $o$, is formed at the side of the frame support of the weight G, through which the guide rod F, passes, and in the side of the cage A, a loop $p$, is produced by bending the wire, or in any other suitable manner, there being a similar loop or eye $r$, formed in one limb of the frame D, about in the same horizontal plane with the loop $p$. There is a ring or leading eye $s$, formed on the end of the brace rod $i$, which projects outside of its point of connection with the guide rod F, that serves to prevent displacement of the guide rod, and acts as a guide itself for a twine strand.

In use, the device is hung above a counter or at any other place where twine is to be used frequently, and a twine ball is placed in the cage A. The end portion of the ball of twine B, is unwrapped sufficiently, and is first passed through the loop $p$, in the cage side, then through the loop $r$, and thence is downwardly extended passing through the eye $s$, and as much farther as may be necessary. A surplus amount of twine is unwrapped from the ball B, and wound upon the exterior of the cage A, by rotating it, the depending strand B', of the twine hanging within reach of the user. The weight G, normally rests at the base of the spiral track E, and when twine is removed by a draft on the depending strand B', the resulting rotating of the cage A, will cause the weight to be elevated be reason of the contact of the lower frame limb $m$, with the spiral track E, that is simultaneously rotated; and when draft strain is relaxed, the descent of the weight by gravity, will reverse the rotation of the cage and track so as to wind up the slack of the twine.

Having thus described our invention, what we claim as new, and desire to secure by Letters Patent, is—

1. The combination with a cylindrical wire cage, having a center plate in its bottom, a shaft secured centrally and depending from the plate, a flange on the shaft below and near to the center plate, and a bracket frame having a disk below on it which is loose on the shaft between the center plate and flange, of a spiral track concentric with the shaft, secured below thereto and above to the flange on said shaft, a depending guide rod, and a weight having a frame that is loosely secured on the shaft by its limbs that have contact with the spiral track and a looped engagement with the guide rod, substantially as described.

2. The combination with a skeleton wire cage, a center plate on the cage bottom, a depending shaft attached to the center of said plate, a spaced radial flange on the shaft below the plate, an apertured disk loose on the shaft between the center plate and radial flange, and a bent wire bracket frame having its lower part secured to the disk, of a pendent guide rod, a fixed collar below on the shaft, a loose collar on the shaft, below the fixed collar, a lateral brace rod projecting from the loose collar engaged by the pendent guide rod and having an eye on its end, a weight held by a frame in loose connection with the shaft and guide rod, and a concentric spiral track secured at its ends to the fixed collar and radial flange on the shaft and having loose contact with the limbs of the weight frame, substantially as described.

JOHN E. TRACY.
ARTHUR N. GRAHAM.

Witnesses:
WILLIAM CLAFLIN,
W. TONNE CLAFLIN.